No. 888,362. PATENTED MAY 19, 1908.
C. P. STEINMETZ.
MONOCYCLIC SYSTEM OF ELECTRIC DISTRIBUTION.
APPLICATION FILED MAR. 30, 1895.
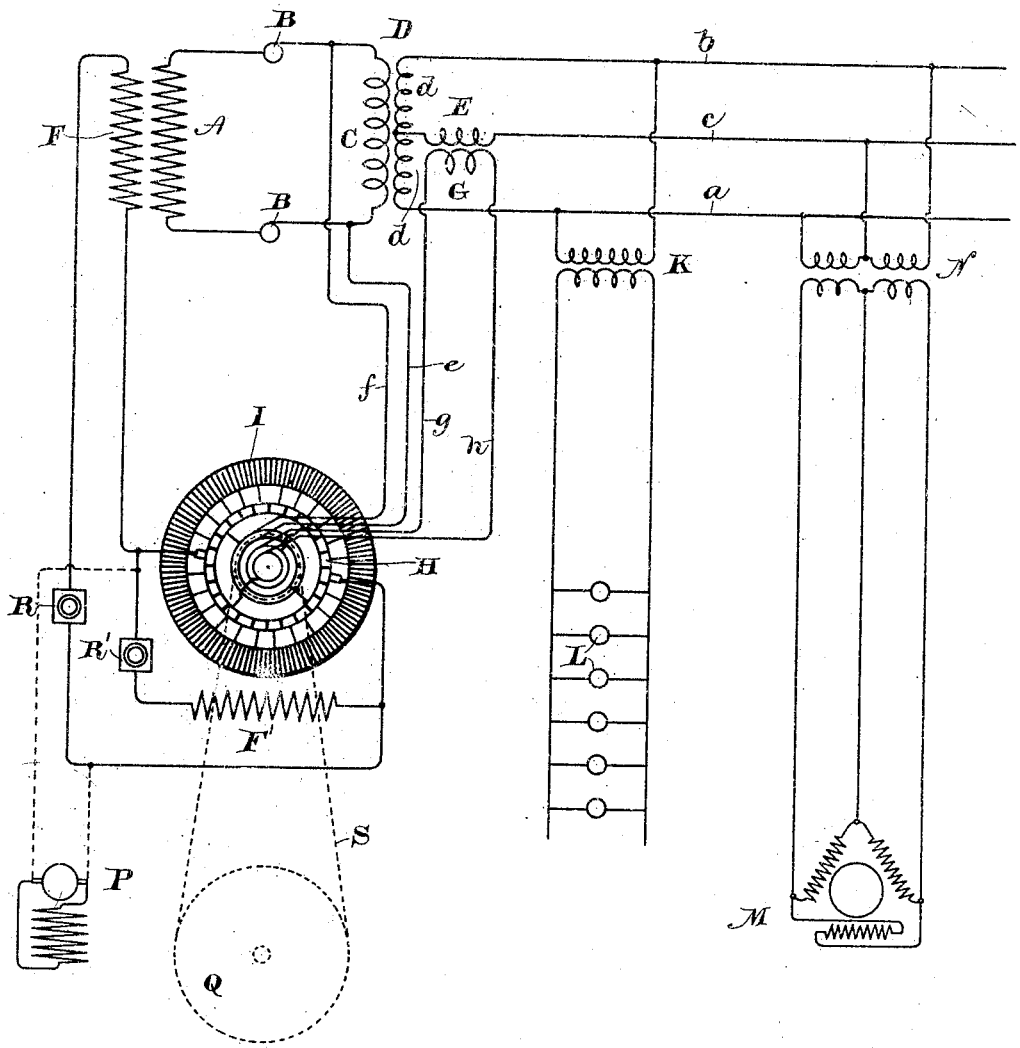
WITNESSES
A. F. Macdonald.
B. B. Hull.
INVENTOR
Charles P. Steinmetz,
by Geo. R. Blodgett
Atty.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

MONOCYCLIC SYSTEM OF ELECTRIC DISTRIBUTION.

No. 888,362.  Specification of Letters Patent.  Patented May 19, 1908.

Application filed March 30, 1895. Serial No. 543,809.

*To all whom it may concern:*

Be it known that I, CHARLES P. STEINMETZ, a subject of the Emperor of Germany, residing at Schenectady, in the county of Schenectady and State of New York, have invented certain new and useful Improvements in Monocyclic Systems of Electric Distribution, of which the following is a specification.

My invention relates to systems of electric generation and distribution, now known in the art as "monocyclic", such as that described in my patent No. 533,244, dated Jan. 29, 1895, and in other patents granted to me; and has for its main object to provide a means of so reconstructing existing alternating current plants of the single phase type, that they may be adapted, at a minimum of expense and with the greatest utilization of their existing structure, to the generation of monocyclic currents and to supply power to motors of the monocyclic or of the three phase type.

My invention is also applicable, however, to monocyclic systems in general.

For the purposes pointed out, I use an auxiliary machine driven synchronously with the existing main generator of single phase currents. This machine is so arranged that its electro-motive force is in quadrature to that of the main machine; and it is so connected to an auxiliary third main that between this main and the ordinary mains of the single phase system a displaced electro-motive force exists; which may be arranged, as in my patents above referred to, to give any desired displacement of phase, and consequently any effect desired by the engineer. I have preferred to illustrate in this case a motor-generator as the particular type of auxiliary machine desired; and I have also illustrated this machine supplying from one side of its armature winding a continuous current exciting the field-magnets of the main alternator, and also its own field-magnets. This particular combination is of value, and I desire to be understood as claiming it; but the claims which I have made to the auxiliary machine are generic and I do not mean to be limited to this special type.

It is manifest that it is immaterial how the particular machine is driven, except that it must be synchronously driven. I have shown it as driven by a direct electrical connection to the main dynamo. It may, however, be connected in any way so as to be driven synchronously, by connecting it by an inductive connection, as by the interposition of suitable transformers, or in any other way. I have also shown the machine as connected to the mains by transformation or an inductive connection, but this also is immaterial, a it may be directly connected if desired.

The accompanying drawing shows a diagrammatic embodiment of my invention. Therein A is the armature of the main alternating current machine; F is the field-magnet; B, B are the collecting rings; C is the primary coil of the transformer D of which $d$, $d$ are the secondaries and $a$, $b$, $c$ are the mains or leads. The mains $a$, $b$ carry the ordinary single phase current, being connected to the ends respectively of the coils $d$, $d$, while the main $c$ is the main of displaced electro-motive force.

I is the motor generator to which I have referred in my statement of invention. It is connected to the collector rings, or to mains extending from them, by the leads $e, f$ going to collector rings upon the armature of the motor generator. This motor-generator is furnished with a commutator H, with the usual brushes bearing thereon, and by suitable connections feeds continuous current to the field-magnet F of the main alternator and to its own field-magnet $F^1$, resistances R, $R^1$ being included in the circuits to regulate the output in the usual way.

The machine is supplied with four collecting rings, and as illustrated has an ordinary ring winding, for which any other suitable winding may be substituted; as already described, two of the collecting rings connect with the main alternator; the other two connect by leads $g$, $h$ with the primary G of a transformer, the secondary E of which is connected in series in the main $c$, which main connects to the middle point between the coils $d$, $d$ of the transformer D. Between the mains $a$, $b$ is connected a transformer K supplying the lamps L with single phase current, while connected across all three of the mains is a separate transformer N supplying an induction motor M having one of its coils reversed, as described in my Patents Nos. 533,245 and 533,378 of January 29, 1895.

For the purpose of obtaining the voltage from the motor generator I in quadrature to that supplied from the main armature A, the connections of the collecting rings of the motor generator are arranged so that the current leaving this armature by the mains $g, h$, is taken from points in the armature winding 90° from those to which the current is delivered from the mains $e, f$ through the other pair of collecting rings; the connections of the collecting rings being illustrated as made to suitable points upon the commutator H to accomplish this purpose. Where the motor generator I is the only source of exciting current, it will be necessary to bring it up to synchronism by some connection to the prime mover, which I have indicated in dotted lines as a belt S connected to the wheel Q indicating diagrammatically the main driving power of the station. Where, however, there is already an exciter in the station, the motor-generator may be run up to synchronism on its continuous current side by connecting the exciter P between the mains supplied from that side.

I do not mean to limit myself to any particular type of machine as an auxiliary, as a small armature of any kind may be employed, if suitably connected. If a motor-generator be selected, it may be provided with two windings or one upon its armature, and in general any suitable changes may be made without varying from my invention.

What I claim as new and desire to secure by Letters Patent of the United States is,

1. In combination, a main generator of single phase alternating current, mains supplied thereby, a third main, a motor-generator run from the single phase machine, and supplying displaced electro-motive force to the third main, a commutator upon the motor generator, and connections from the commutator to the field-magnets of the motor-generator and the main alternator.

2. In combination, a main generator of single phase alternating current, mains supplied thereby, a third main in electrical connection with said mains, and a motor generator run from the single phase machine and adapted to supply alternating currents to said third main and direct current to the field of the generator.

3. The combination of two secondary coils, a connection between the terminal of one of said coils and an intermediate point in the length of the other, a primary coil for each secondary coil, and two dynamo-electric machines connected respectively to said primary coils.

4. The combination of an alternating-current dynamo-electric machine, a rotary converter provided with multiphase connections, current conveying leads between some of said connections and mains fed by said machine, current conveying means between other connections of the rotary converter and a third main associated with the first mentioned mains, and electrical connections between the direct-current terminals of said rotary converter and the field of said dynamo-electric machine.

5. The combination of an alternating-current generator, leads extending therefrom, a phase-changing device connected across said leads, a transformer with its primary connected across said leads, and current-transmitting connections between the phase-changing device and the secondary of said transformer.

In witness whereof I have hereunto set my hand this 22nd day of March, 1895.

CHARLES P. STEINMETZ.

Witnesses:
B. B. HULL,
A. F. MACDONALD.